United States Patent
Slavik

(10) Patent No.: US 8,200,464 B2
(45) Date of Patent: Jun. 12, 2012

(54) EXPLOSION SIMULATION IN FINITE ELEMENT ANALYSIS

(75) Inventor: Todd Patrick Slavik, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 444 days.

(21) Appl. No.: 12/582,947

(22) Filed: Oct. 21, 2009

(65) Prior Publication Data
US 2010/0256957 A1    Oct. 7, 2010

Related U.S. Application Data

(60) Provisional application No. 61/165,511, filed on Apr. 1, 2009.

(51) Int. Cl.
G06G 7/50    (2006.01)
G06F 7/60    (2006.01)

(52) U.S. Cl. ............................................... 703/9; 703/2
(58) Field of Classification Search .................. 703/2, 9
See application file for complete search history.

(56) References Cited

U.S. PATENT DOCUMENTS

| | | | |
|---|---|---|---|
| 6,678,642 B1 * | 1/2004 | Budge | 703/2 |
| 7,382,367 B1 * | 6/2008 | Lu et al. | 703/2 |
| 7,610,184 B1 * | 10/2009 | Tillman et al. | 703/2 |
| 2004/0226231 A1 * | 11/2004 | Dlubak | 52/204.1 |
| 2006/0002631 A1 * | 1/2006 | Fu et al. | 382/294 |
| 2008/0189068 A1 * | 8/2008 | Brusoe | 703/8 |
| 2008/0228413 A1 * | 9/2008 | Pilon | 702/33 |
| 2012/0047634 A1 * | 3/2012 | Vaidya | 525/153 |

FOREIGN PATENT DOCUMENTS

| | | | |
|---|---|---|---|
| EP | 2237175 A1 | * | 10/2010 |
| JP | 2010244531 A | * | 10/2010 |

OTHER PUBLICATIONS

Fourth MIT Conference on Computational Fluid and Solid Mechanics "Numerical simulation of the fluid—structure interaction between air blast waves and free-standing plates" by Kambouchev et al (vol. 85, Issues 11-14, Jun.-Jul. 2007, pp. 923-931).*

European Patent Office: "The extended European search report for application No. 1015946.0-2224", Jul. 7, 2010.

(Continued)

Primary Examiner — Kamini S Shah
Assistant Examiner — Akash Saxena
(74) Attorney, Agent, or Firm — Roger H. Chu

(57) ABSTRACT

Systems and methods of simulating an explosion in time-marching finite element analysis are disclosed in the present invention. A method is configured for increasing user (e.g., engineer or scientist) productivity by reducing computation time of simulating fluid-structure interaction due to an explosion. The method comprises a creation of a finite element analysis model that includes structure, surrounding fluid, a blast source of the explosion and a single layer of ambient elements each having a segment representing a boundary of the fluid facing the blast source. Each ambient element is associated with a particular finite element representing the fluid at the boundary. The ambient elements are configured to be situated between the blast source and the structure such that the simulation can be carried on a set of boundary conditions specified thereon. The boundary conditions comprise a set of nodal velocities that are determined from the empirical formula (e.g., Friedlander equation).

12 Claims, 6 Drawing Sheets

OTHER PUBLICATIONS

Kambouchev et al.: "Numerical simulation of the fluid-structure interaction between air blast waves and free-standing plates", Computers & Structures 85 (2007) pp. 923-931 Jan. 4, 2007.

Slavik: "A coupling of empirical explosive blast loads to ALE air domains in LS-DYNA(R)", 7th European LS-DYNA Conference, 2009.

Rajendran et al.: "Blast loaded plates", Marine Structures 22 (2009) pp. 99-127.

Yngve et al.:"Animating Explosions", Computer Graphics Proceedings, Annual Conference Series 2000.

Liu et al.: "Smoothed particle hydrodynamics for numerical simulation of underwater explosion", Computational Mechanics 30 (2003) pp. 106-118.

* cited by examiner

EXPLOSION SIMULATION IN FINITE ELEMENT ANALYSIS

CROSS REFERENCE TO RELATED APPLICATIONS

This application claims priority from a U.S. Provisional Patent Application Ser. No. 61/165,511 filed Apr. 1, 2009, the entire contents of which are incorporated herein by reference.

FIELD OF THE INVENTION

The present invention generally relates to methods, systems and software product used in computer-aided engineering analysis, more particularly to an improved method of simulating fluid-structure interaction due to an explosion in finite element analysis.

BACKGROUND OF THE INVENTION

Finite element analysis (FEA) is a computer implemented method using a numerical technique for finding approximate solutions of partial differential equations representing complex systems such as three-dimensional non-linear structural design and analysis. The FEA originated from the need for solving complex elasticity and structural analysis problems in civil and aeronautical engineering. With the advance of the computer technology, FEA has become a vital tool for assisting engineers and scientists to make decisions in improving structural design (e.g., automobile, airplane, etc.). When applying FEA in solving a physical problem or event in time domain, it is referred to as a time-marching simulation. In general, a time-marching simulation comprises a number of solution cycles. A FEA result or solution is obtained at each solution cycle as a snap-shot of the total simulation at a particular time.

As popularity of the FEA grows, the use of FEA has been adapted to simulate more complex physical phenomena, for example, fluid-structure interaction due to an explosion. To simulate the behavior of the fluid and structure, a technique referred to as Arbitrary Lagrangian-Eulerian (ALE) finite element method is preferably used.

An exemplary FEA model 100 used for such simulation is shown in FIG. 1. The FEA model 100 comprises a blast source 102 of the explosion, a first FEA mesh (illustrated as a blank pentagon) 112 representing a structure and a second FEA mesh 114 representing the surrounding fluid. The model 100 is shown in two dimensions for illustration simplicity. In general, a three-dimensional model is used in such simulation.

Blast wave 104 is the pressure and flow resulting from the explosion (i.e., the deposition of a large amount of energy in a relatively small and localized volume). The flow field can be approximated as a lead shock wave, followed by the blast wind. In order to catch simulated physical behaviors of the blast wave 104 traveling through the fluid (or second mesh 114), very fine FEA mesh (i.e., small element) is required in the FEA model 100. The relatively coarse mesh 114 shown in FIG. 1 is for illustration simplicity.

To obtain solution at each solution cycle of the time-marching simulation, explicit time integration scheme is used. One requirement in the explicit time integration scheme is that the time-step or time increment between solution cycles must be equal to or smaller than the critical time-step, which is controlled and determined by smallest dimension (e.g., smallest element) used in a FEA model and speed of sound in the medium (e.g., air, water, steel, etc.) of the FEA model.

Since the second mesh 114 is required to be very fine to capture the behavior of the blast wave, it would require a very small time-step to simulate fluid-structure interaction due to an explosion. As a result, a large number of solution cycles are needed. This leads to a very long computation time even with most up-to-date state-of-the-art computer systems and thereby decreasing the productivities of the users (e.g., engineers, scientists, etc.).

It would, therefore, be desirable to have an improved method for a time-marching simulation of an explosion in finite element analysis to avoid the aforementioned problems, drawbacks and shortcomings of the prior art approaches.

BRIEF SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of simulating an explosion in time-marching finite element analysis are disclosed in the present invention. According to one aspect, a method is configured for increasing user (e.g., engineer or scientist) productivity by reducing computation time of simulating fluid-structure interaction due to an explosion. The method comprises a creation of a FEA model that includes structure, surrounding fluid, a blast source of the explosion and a single layer of ambient elements containing a segment representing a boundary of the fluid facing the blast source. The ambient elements are configured to be situated between the blast source and the structure such that the simulation can be carried out on a set of boundary conditions specified thereon. The boundary conditions comprise pressures and nodal velocities that are determined from the empirical formula (e.g., Friedlander equation) of the blast source.

With the layer of the ambient elements included in the FEA model, FEA mesh representing the fluid (e.g., ALE finite elements) between the blast source and the segments is not required. The restriction is that the fluid between the blast source and the segments is homogeneous. Properties of the explosion are represented by the location and mass of the blast source, and a denotation time. Generally the FEA model is defined in a global coordinate system, in which the location of the blast source can be specified.

Using the distance between each segment and the blast source, and the blast source properties, the blast pressure can be determined empirically using a functional form such as the Friedlander equation. Then a set of corresponding nodal velocities can be computed, using, for example, the Rankine-Hugoniot relationship, and assigned to respective nodes of each of the ambient elements from the blast pressure. Once the nodal velocities of the boundary element are established, the element internal energy can be calculated in accordance with a particular equation of state (e.g., gamma law applied to an ideal gas). The relative volume of each ambient element is calculated thereafter with an isentropic relationship. The standard procedure of mesh smoothing and advection (i.e., result or state mapping) in the ALE finite element method is also employed at each solution cycle.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

Explicit FEA refers to M a=F, where "M" is the diagonal mass array, "a" is the unknown nodal acceleration array and "F" is the effective loads array. The solution can be carried out at element level without factorization of a matrix. One exemplary solution method is called the central difference method.

Solid element refers to a three-dimensional continuum finite element, for example, a 4-node tetrahedral element, an 8-node hexahedral element, etc.

Embodiments of the present invention are discussed herein with reference to FIGS. 2-7. However, those skilled in the art will readily appreciate that the detailed description given herein with respect to these figures is for explanatory purposes as the invention extends beyond these limited embodiments.

Figure 1:
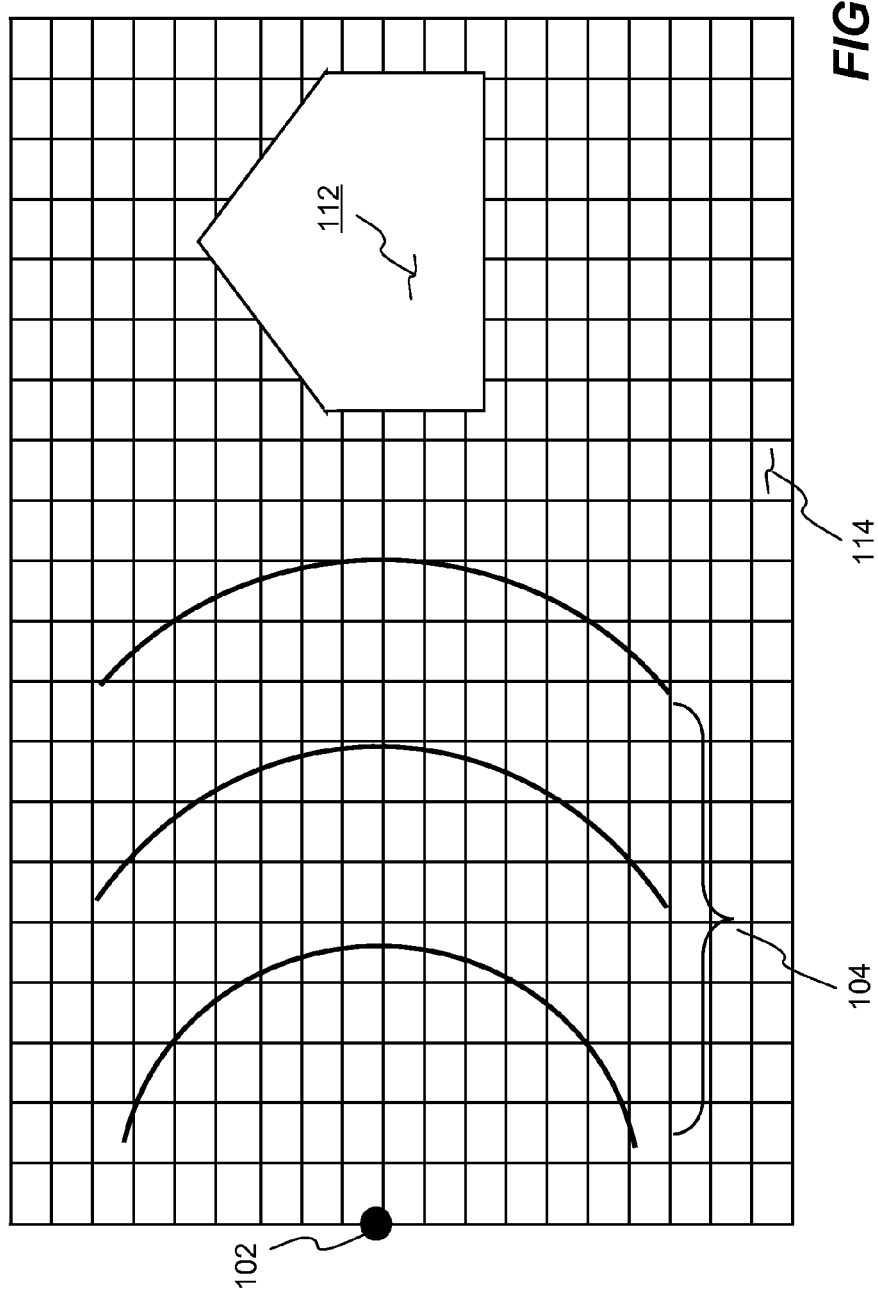
FIG. 1 is a diagram showing a two-dimensional view of a finite element analysis model used for simulating an explosion in a prior art approach.
Figure 2:
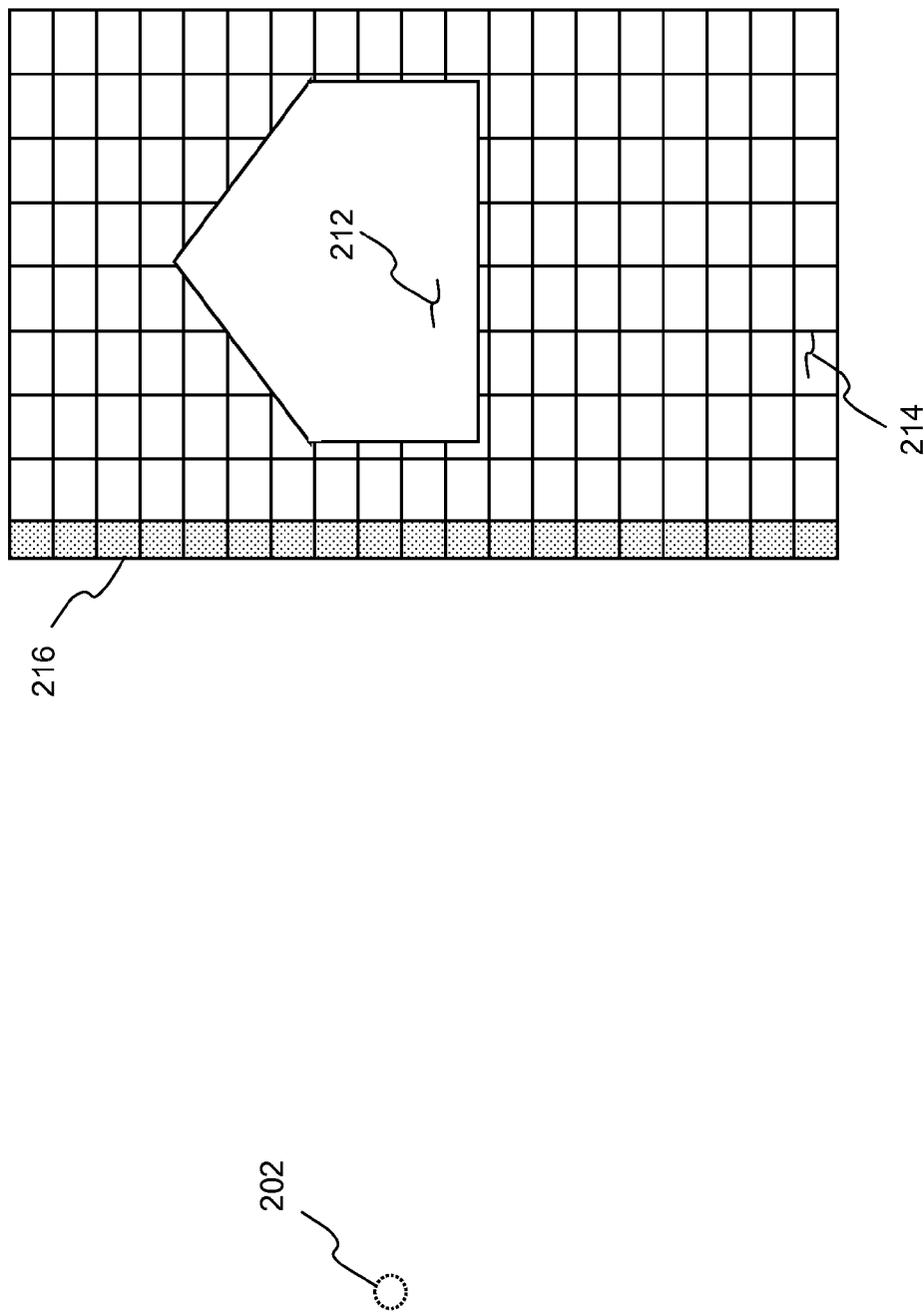
FIG. 2 is a diagram showing a two-dimensional view of an exemplary finite element analysis model used for simulating fluid-structure interaction due to an explosion, according to one embodiment of the present invention.

Referring first to FIG. 2, it is shown a two-dimensional view of an exemplary finite element analysis model 200 used for simulating fluid-structure interaction due to an explosion, according to an embodiment of the present invention. The FEA model 200 comprises a first group of finite elements 212 (shown as a blank area) representing the structure, a second group of finite elements 214 representing the surrounding fluid, and a layer of ambient elements 216 located at a boundary of the fluid. Each ambient element contains a segment facing the blast source 202 of the explosion. In one embodiment, each of the ambient elements 216 is configured for receiving information from the blast equations (e.g., Friedlander equation, physical test data, etc.) and for converting the received information to thermodynamic state data to be applied to respective nodes as a boundary condition of the finite element analysis.

For illustration simplicity, the FEA model 200 is shown in a two-dimensional view. In general, the FEA model 200 comprises three-dimensional objects, for example, one or more three-dimensional structural models with three-dimensional grid or mesh representing the surrounding fluid (i.e., air or water).

Figure 3:
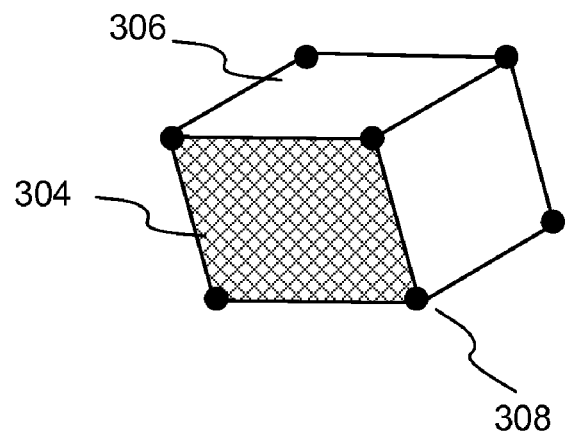
FIG. 3 is a diagram showing an exemplary ambient element for boundary of the fluid in accordance with one embodiment of the present invention.

Each of the ambient elements 216 is associated with a particular finite element 214 in the second group along the fluid boundary. An exemplary ambient element 306 and associated segment 304 are shown in FIG. 3. The segment 304 is a closed polygon (e.g., quadrilateral, triangle) that can be one of the faces or sides of the solid element (i.e., three-dimensional finite element). Nodes 308 of the ambient element 306 are shown as corner nodes. Generally, low-order single integration point elements have one integration point at the centroid of the solid element. Certain higher order element may have additional nodes on the edge (e.g., one per edge) and additional integration points (e.g., four) located in the interior.

Figure 4:
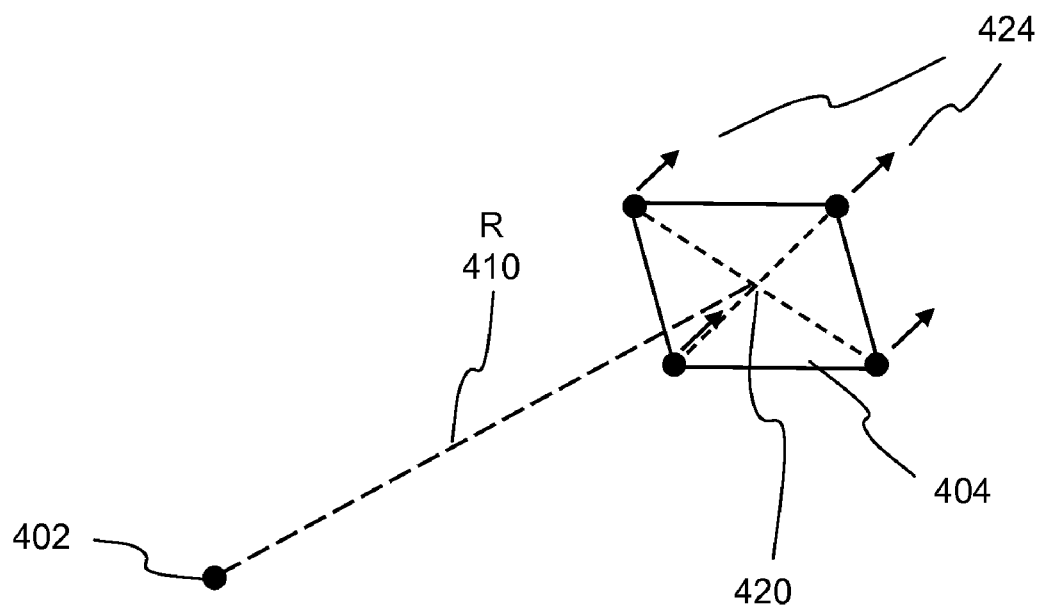
FIG. 4 is a diagram showing a relationship between a segment of an ambient element and the blast source of the explosion, according to an embodiment of the present invention.
Figure 5:
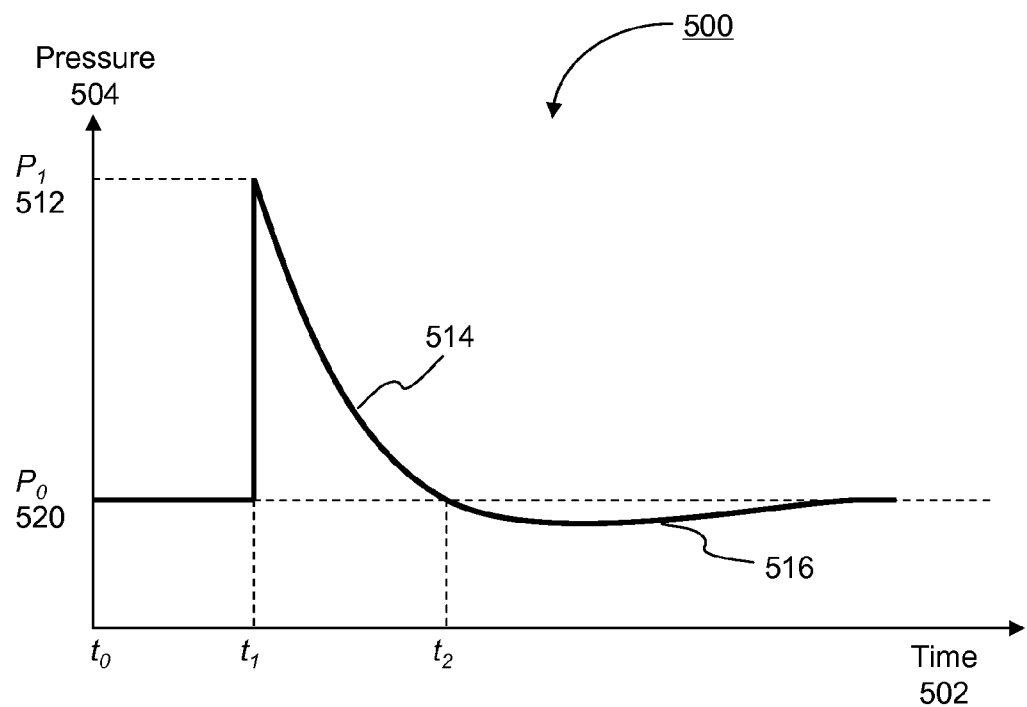
FIG. 5 is an X-Y plot showing an exemplary relationship of blast pressure versus time in accordance with one embodiment of the present invention.

The ambient elements 216 are so situated that the blast pressure from the explosion can be determined empirically, for example, using the Friedlander equation. FIG. 4 is a diagram showing blast pressure is calculated at the center 420 or centroid of a segment 404 of an ambient element (not shown). The blast pressure is a function of time and a characteristic distance "Z" as follows: $P=P(Z, t)$, where $Z=R/M^{1/3}$. "R" 410 is distance between the blast source 402 and the center 420 of the segment 404, "M" is the mass of the blast source 402, and "t" is the simulation time in a time-marching FEA. An exemplary blast pressure versus time curve is shown in FIG. 5 below. From the blast pressure a set of nodal velocities 424 can be computed using the Rankine-Hugoniot relation and an empirical dynamic pressure decay law.

In FEA model 200, no finite elements are required between the blast source 202 and the layer of ambient elements 216. Time-marching simulation of the explosion can be performed by applying a set of proper boundary conditions on the finite element along the boundary associated with the layer of ambient elements 216, which is configured to provide such function. As a result, the computation time for performing a simulation of fluid-structure interaction due to an explosion is reduced. Therefore, the problems and shortcomings of the prior art approaches are overcome by the present invention.

The FEA model 200 is defined in a global coordinate system (not shown), in which a location of the blast source 202 can be specified. Additionally, properties the blast source 202 includes a mass and detonation time.

FIG. 5 is an X-Y plot showing an exemplary curve of pressure 504 versus time 502 of the blast pressure 500 due to an explosion at a particular location in accordance with one embodiment of the present invention. Blast pressure 500 is equal to an initial ambient pressure $P_0$ 520 (e.g., atmosphere pressure in an open space) when time is at zero or $t_0$, and stays constant until time $t_1$. Blast pressure 500 then jumps to peak pressure $P_1$ 512, which corresponds to the moment when the blast wave reaches the particular location. The magnitude of the peak pressure $P_1$ 512 is a function of distance between the particular location and the blast source, and the mass of the blast source. Blast pressure 500 drops off thereafter. Depending upon types of transmission medium (e.g., air, water) and the particular location, the trailing portion 514 of the blast pressure 500 can decay in various forms. While the exemplary blast pressure 500 shown in FIG. 5 approaches to a value below the atmosphere pressure $P_0$ 520, other values are possible (e.g., above the atmosphere pressure, negative pressure (i.e., below the time axis), etc.). The Friedlander equation may be used for mathematically representing the decay between $t_1$ and $t_2$. In one embodiment, incident pressure $P_{inc}$ according to the Friedlander equation has the following form:

$$P_{inc}(t) = P_s\left[1 - \frac{t-t_1}{t_2-t_1}\right]e^{-\alpha\left[\frac{t-t_1}{t_2-t_1}\right]} \quad (1)$$

$$P_s \equiv P_1 - P_0 \quad (2)$$

where time $t_2$ is when pressure of the trailing portion 514 decays to $P_0$ 520, $\alpha$ is the waveform decay parameter. The negative phase 516 of the blast pressure 500 (i.e. pressure drops below the ambient pressure $P_0$ 520) is present only at distances generally greater than about 10 times the charge radius, and is accommodated by the Friedlander equation.

Blast pressure at respective segments of the ambient elements is calculated and used to determine a set of nodal velocities applied to respective nodes of the ambient elements. The fluid-structure interaction is computed using the ALE based finite element analysis based on the boundary conditions of these applied nodal velocities along with the element internal energy and relative volume. In one embodiment, the relative volume is defined as the ratio between original and current density of the element.

In one embodiment, within the context of the ideal gas law, the pressure and density can be used to describe the thermodynamic stat of the air, hence, the incident pressure from the blast wave is straightforwardly prescribed at the quadrature point of the ambient element. The density of the air in the ambient element is calculated in the following manner. When shocked from ambient atmospheric denisity $\rho_0$ the density of the air at the shock front $\rho_1$ is obtained from the Rankine-Hugoniot jump discontinuity relation:

$$\frac{\rho_1}{\rho_o} = \frac{6(P_1/P_o)+1}{(P_1/P_o)+6} \quad (3)$$

and when treated as an ideal gas the density $\rho$ of the air after passage of the shock front follows the isentropic relation:

$$\rho = \rho_1\left(\frac{P_{inc}+P_o}{P_1}\right)^{1/\gamma} \quad (4)$$

What remains to be determined in order to completely describe the flow conditions of the blast wave is the velocity of the air particles in the blast wind. Appealing again to the Rankine-Hugoniot relations the particle velocity at the shock front "$u_p$" is found with $$\left(\frac{u_p}{C_o}\right)^2 = \frac{25(P_1/P_o-1)^2}{42(P_1/P_o)+7} \quad (5)$$

where $C_o$ is the sound speed in air before arrival of the shock. Equations (3) and (5) are valid for an ideal gas with specific heat ratio of $\gamma=c_p/c_v=1.4$.

Next, the dynamic pressure at the shock front is calculated as:

$$Q_s = \tfrac{1}{2}\rho_1 u_p^2 \quad (6)$$

and decay of the dynamic pressure follows the functional form $$Q = Q_s(1-\zeta)e^{-\phi\zeta} \quad (7)$$

where $\zeta$ is time normalized by the positive duration of the particle velocity and $\phi$ is a decay parameter.

Finally, combining Equations (4), (6) and (7) along with the following yields a means for determination of the particle velocity "u" in the blast wind.

$$Q = \tfrac{1}{2}\rho u^2 \quad (8)$$

This velocity is for the particles at the center or centroid of the ambient element segment which faces the blast and it is subsequently distributed to the nodes of the element in an area-weighted fashion.

Figure 6:
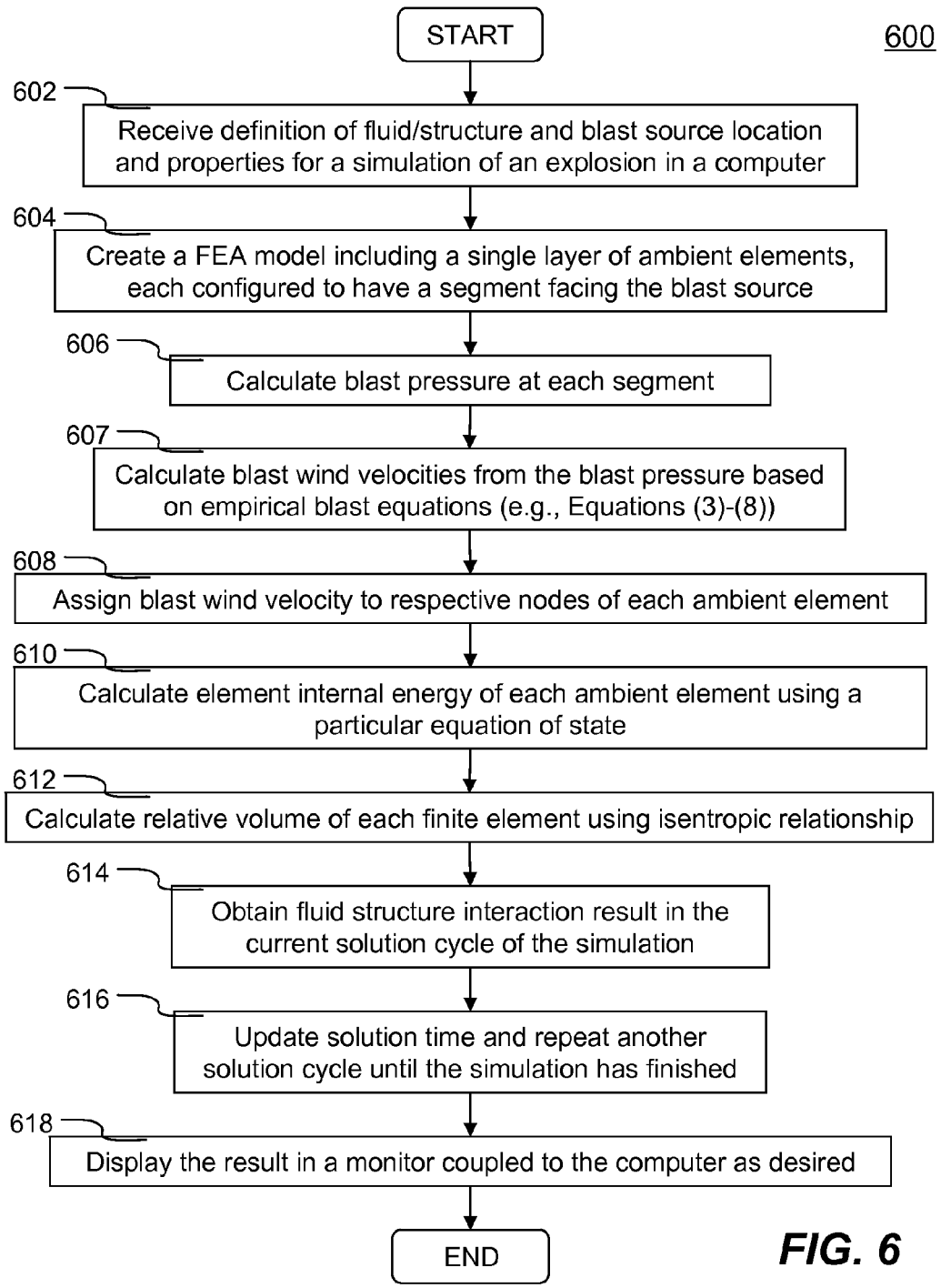
FIG. 6 is a flowchart illustrating an exemplary process of simulating fluid-structure interaction due to an explosion in a finite element analysis, according to an embodiment of the present invention.

Referring now to FIG. 6, a flowchart is shown as exemplary process 600 of simulating fluid-structure interaction due to an explosion using a finite element analysis based on the arbitrary Lagrangian-Eulerian (ALE) technique, according to an embodiment of the present invention. Process 600 is preferably understood with previous figures and can be implemented in software.

Process 600 starts by receiving a definition of structure with surrounding fluid and a set of properties pertaining to the blast source of the explosion in a computer at step 602. An ALE based finite element application module is installed on the computer. The definition of the structure comprises physical dimensions and properties and the definition of the fluid comprises type (e.g., air, water or other fluid media) and physical properties (e.g., density) of the fluid. The properties of the blast source include the location of the source relative to the structure, the mass, etc. At step 604, a finite element analysis model is then created based on the received definition. The finite element model includes at least two groups of finite elements. One group represents the fluid while the other represents the structure. Additionally, a layer of ambient elements is also created on the boundary of the fluid. Each ambient element contains a segment facing the blast source and corresponds to a particular finite element in the group representing the fluid. Each ambient element is so configured that a blast pressure initial/boundary condition can be applied in accordance with the received definition, for example, the location and mass of the blast and location of the segment, properties of the fluid, detonation time of the explosion.

The fluid is generally represented with a group of three-dimensional continuum elements (e.g., solid elements). In order to capture the behavior of the shock wave and the blast wind through the fluid and fluid-structure interaction, proper size of the finite elements is determined and created according to the requirement in the underline theory of explicit time integration. For example, the size must be relatively small enough to ensure capturing propagation of the blast wave. Each segment is so situated that the blast pressure of the explosion can be determined from an empirical formula (e.g., Friedlander equation) based on the distance between the blast source and the segment, detonation time and transmission medium (i.e., fluid) at step 606. In other words, there exists only a fluid transmitting the blast wave between the blast source and each of the ambient elements. One of the objectives of the present invention is to place the ambient elements in a location such that the time-marching simulation of the explosion can be carried out with substantially more efficient (i.e., faster simulation) thereby increasing productivity of user (e.g., scientist, engineer). In one embodiment, the blast pressure at each ambient element is calculated at the centroid of the segment shown in FIG. 4.

Next, at step 607, blast wind velocity is calculated from the blast pressure at each segment based on empirical blast equations (e.g., Equations (3)-(8)). The blast wind velocity is then assigned to respective nodes of the ambient elements at step 608. The assignment can be carried out in a number of well-known procedures, for example, a simple average, a weighted average, or other equivalent mass conserving schemes. After nodal velocities are applied to the respective ambient elements, a regular explicit time integration can be carried out in current solution cycle of the time-marching simulation of the explosion. At step 610, the internal energy of each ambient element is calculated in accordance with a particular equation of state (e.g., gamma law applied to ideal gas). The internal energy is generally evaluated or calculated at each integration point of the finite element. Lower order element comprises only one integration point, while higher order element contains more than one. At step 612, relative volume of each finite element is calculated using an isentropic relationship to obtain fluid-structure interaction result of the current solution cycle at step 614. According to the ALE technique, a mesh smoothing and result remapping operation is performed after each solution cycle.

After the result has been obtained in each solution cycle, the solution time is incremented for performing another time integration solution in the next solution cycle until the total simulation time has been reached at step 616. Finally, at step 618, the fluid-structure interaction result of all solution cycles in the simulation can be displayed to a monitor coupled to the computer to assist users to investigate and understand the explosion impact on the structure. The process 600 ends thereafter.

Figure 7:
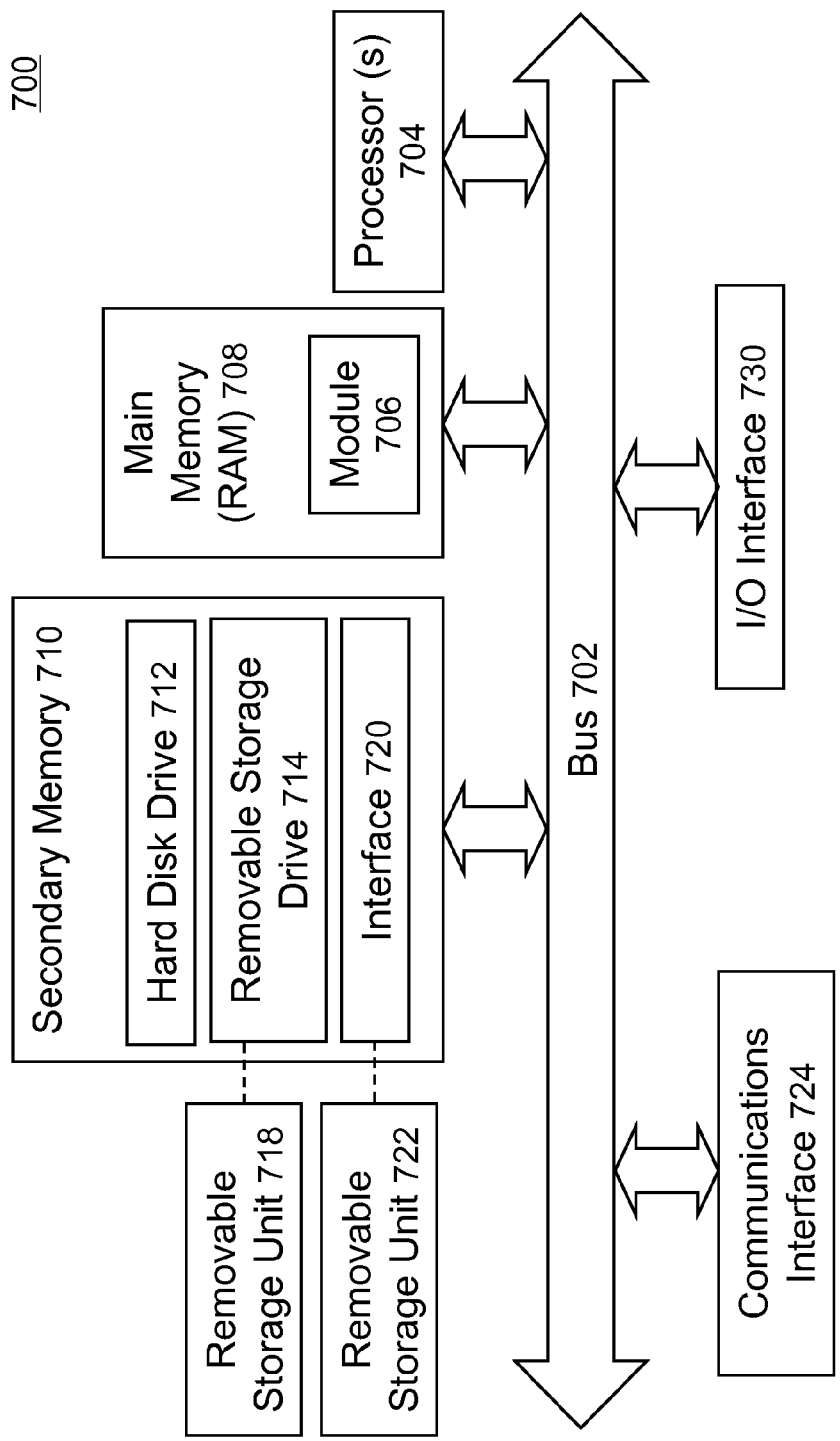
FIG. 7 is a function diagram showing salient components of a computing device, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, flash memory card reader, etc. The removable storage drive 714 reads from and/or writes to a removable storage unit 718 in a well-known manner. Removable storage unit 718, represents a floppy disk, magnetic tape, optical disk, flash memory, etc. which is read by and written to by removable storage drive 714. As will be appreciated, the removable storage unit 718 includes a computer recordable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc.

The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700.

In this document, the terms "computer program medium" and "computer recordable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 (e.g., finite element analysis application module based on ALE technique) that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The result and/or status of the finite element analysis (e.g., fluid-structure interaction result) is reported to the user via the I/O interface 730 either in a text or in a graphical representation to a monitor coupled to the computer.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the finite elements have been shown and described as hexahedral solid elements. Other types of equivalent continuum three-dimensional finite element can be used, for example, tetrahedral element. Additionally, whereas the segment has been shown as a two-dimensional quadrilateral. Other equivalent shapes may be used, for example, triangle, multi-sided polygons, etc. Furthermore, whereas the Friedlander equation has been described as the empirical formula for calculating the blast pressure. Other types of empirical formulas can be used instead, for example, a result of physical experiment or test. Finally, whereas the gamma law has been described for ideal gas, other governing laws and relationships may be used for other types of fluid, for example, water. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method executed in a computer system for simulating an explosion in a time-marching simulation using a finite element analysis (FEA) comprising:

receiving a definition of at least one structure with surrounding fluid and a set of properties of a blast source of the explosion in a computer system that has a finite element analysis application module installed thereon;

creating a FEA model having a first group of finite elements representing the at least one structure, a second group of finite elements representing the surrounding fluid, and a layer of ambient elements as an outer boundary of the second group, where each of the ambient elements contains a segment facing the blast source and is associated with a respective adjoining finite element in the second group;

calculating, at the segment of said each of the ambient element, a blast pressure and corresponding blast wind velocity based on a set of empirical blast equations;

initially assigning the blast wind velocity as a set of nodal velocities of said each of the ambient elements in a time-marching simulation that contains a plurality of solution cycles;

obtaining a fluid-structure interaction result in a current solution cycle of the time-marching simulation by performing a mesh smoothing operation of the FEA model, mapping the fluid-structure interaction result to the smoothed FEA model and calculating a relative volume of each finite element of the second group using an isentropic relationship; and displaying, in an output device coupled to the computer system, the fluid-structure interaction result of any or all of the solution cycles of the time-marching simulation of the explosion as desired after the time-marching simulation has completed.

2. The method of claim 1, wherein the set of properties of the blast source includes a location and a mass of the blast source.

3. The method of claim 1, wherein each of the second group of finite elements comprises a hexahedral or tetrahedral solid element.

4. The method of claim 1, wherein the blast pressure is configured based on Friedlander equation.

5. The method of claim 1, wherein the blast pressure is derived from a physical experiment test of the explosion in the surrounding fluid.

6. The method of claim 1, wherein the blast wind velocity is calculated from the blast pressure according to Rankine-Hugoniot relationship.

7. The method of claim 6, wherein said initially assigning the blast wind velocity as the set of nodal velocities of said each of the ambient elements is based on a predetermined scheme of simple or weighted average.

8. The method of claim 1, further comprises calculating an element internal energy of said each of the ambient element based on a particular equation of state.

9. The method of claim 8, wherein the particular equation of state comprises a gamma law applied to ideal gas.

10. A non-transitory computer recordable storage medium containing computer executable instructions which, when executed on a computer, perform a method of simulating an explosion in a time-marching simulation using a finite element analysis (FEA), said method comprising:

receiving a definition of at least one structure with surrounding fluid and a set of properties of a blast source of the explosion in a computer system that has a finite element analysis application module installed thereon;

creating a FEA model having a first group of finite elements representing the at least one structure, a second group of finite elements representing the surrounding fluid, and a layer of ambient elements as an outer boundary of the second group, where each of the ambient elements contains a segment facing the blast source and is associated with a respective adjoining finite element in the second group;

calculating, at the segment of said each of the ambient element, a blast pressure and corresponding blast wind velocity based on a set of empirical blast equations;

initially assigning the blast wind velocity as a set of nodal velocities of said each of the ambient elements in a time-marching simulation that contains a plurality of solution cycle;

obtaining a fluid-structure interaction result in a current solution cycle of the time-marching simulation by performing a mesh smoothing operation of the FEA model, mapping the fluid-structure interaction result to the smoothed FEA model and calculating a relative volume of each finite element of the second group using an isentropic relationship; and displaying, in an output device coupled to the computer system, the fluid-structure interaction result of any or all of the solution cycles of the time-marching simulation of the explosion as desired after the time-marching simulation has completed.

11. The non-transitory computer recordable storage medium of claim 10, further comprises calculating an element internal energy of said each of the ambient element based on a particular equation of state.

12. A system for simulating an explosion in a time-marching simulation using a finite element analysis (FEA) comprising:

a main memory for storing computer readable code for a FEA application module;

at least one processor coupled to the main memory, said at least one processor executing the computer readable code in the main memory to cause the FEA application module to perform operations of:

receiving a definition of at least one structure with surrounding fluid and a set of properties of a blast source of the explosion;

creating a FEA model having a first group of finite elements representing the at least one structure, a second group of finite elements representing the surrounding fluid, and a layer of ambient elements as an outer boundary of the second group, where each of the ambient elements contains a segment facing the blast source and is associated with a respective adjoining finite element in the second group;

calculating, at the segment of said each of the ambient element, a blast pressure and corresponding blast wind velocity based on a set of empirical blast equations;

initially assigning the blast wind velocity as a set of nodal velocities of said each of the ambient elements initially in a time-marching simulation that contains a plurality of solution cycle;

obtaining a fluid-structure interaction result in a current solution cycle of the time-marching simulation by performing a mesh smoothing operation of the FEA model, mapping the fluid-structure interaction result to the smoothed FEA model and calculating a relative volume of each finite element of the second group using an isentropic relationship; and displaying, in an output device coupled to the main memory, the fluid-structure interaction result of any or all of the solution cycles of the time-marching simulation of the explosion as desired after the time-marching simulation has completed.

* * * * *